Patented Nov. 10, 1931

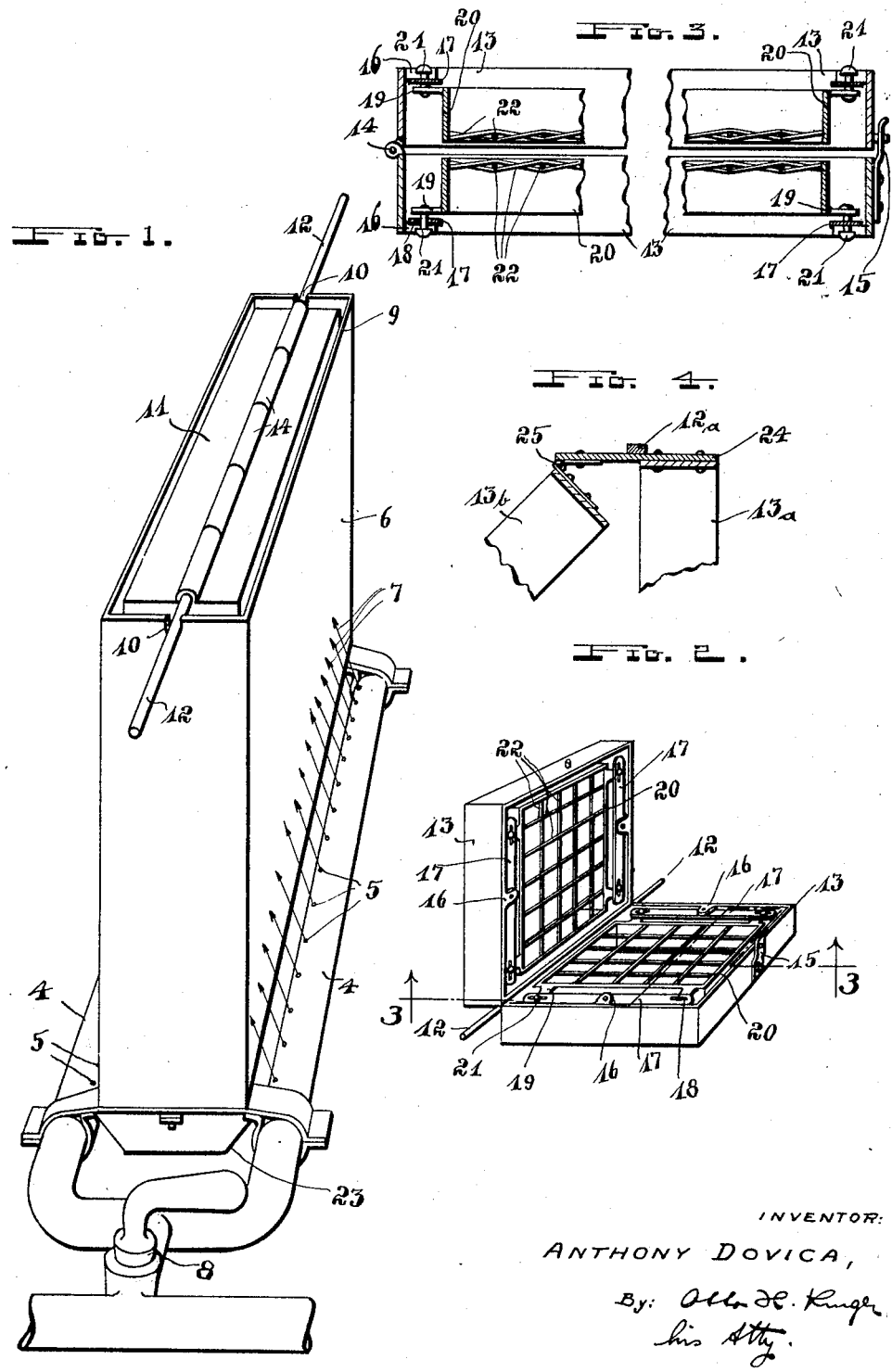

1,831,442

UNITED STATES PATENT OFFICE

ANTHONY DOVICA, OF LOS ANGELES, CALIFORNIA

BROILER

Application filed April 29, 1929. Serial No. 358,944.

This invention relates to devices used for preparing eatables over the open fire or an open flame, such as a gas burner.

One of the objects of this invention is to provide a device by which goods, such as steaks or pieces of meat, may be placed between a hingedly connected pair of gridirons to be suspended over a burner or heater.

Another object is to provide an enclosure disposed edgewise over a burner with an open upper end into which a broiler may be inserted.

Another object is to provide a burner arranged so that the flame will strike the enclosure at an angle upwardly over the two opposite larger flat sides.

Another object is to provide a broiler of a double frame-like structure, one frame being yieldingly mounted within the other, the inner yielding frame being in form of gridirons so that steaks or pieces of meat of various thickness can be placed without any adjustment between the oppositely arranged yieldingly mounted gridirons.

Another object is to provide a structure in which an enclosure, a broiler and a drip pan are arranged over a specifically designed burner to facilitate a broiling in a desired manner.

Other objects will appear from the following description and appended claim as well as from the accompanying drawings, in which—

Fig. 1 is a fragmentary perspective view of a simple burner with a casing disposed on its edge over the burner, so that the flame from the burner may strike the opposite broiler sides of the enclosure, the enclosure having an open upper end with a broiler suspended in it to facilitate a broiling according to this invention.

Fig. 2 is a fragmentary perspective illustration of the hingedly connected double yielding gridiron.

Fig. 3 is a fragmentary cross-section through the pair of gridirons on line 3—3 of Fig. 2 in closed position.

Fig. 4 is a fragmentary cross-section through the double frame structure in a slightly modified form, one of the outer frames being firmly attached to the back of the frame structure and the other outer frame alone being hingedly connected to the back and thereby to the first-named outer frame structure.

As illustrated, a burner is designed so that two tubular bodies 4 become disposed parallel to each other, and these two tubular bodies 4 are provided with orifices 5 by which a discharging of a flame may be assured at such an angle as to strike the oppositely disposed larger flat sides 6 of an enclosure in a manner indicated by the arrows 7.

The gas burner is controllable by the valve 8.

The enclosure 6 forms the oven part of the whole device. The upper end 9 of the enclosure 6 is open and is provided with cutouts 10 for supporting a broiler 11. The broiler 11 is therefore provided with handle portions 12 to engage with the cut-outs or notches 10 whereby the broiler is suspended within the enclosure 6.

The broiler is made of a hingedly connected double frame structure. The double frame structure consists principally of inner and outer frames, the outer frames 13 being hingedly connected as indicated at 14 and being provided with a latch mechanism 15 by which the two outer frames can be held adjacent each other in closed position.

Each of the outer frames is provided with lugs 16 on the opposite end members to each of which a flat spring 17 is attached. The ends of these springs are provided with slots as indicated at 18. Other lugs 19 provided on each of the inner frames 20, having pin-like projections 21, engage slidingly in the slotted ends 18 of the springs 17. The flat springs 17 are in this manner supported at about the middle with the slotted ends disposed to yield in proportion to the thickness of any material placed between the gridirons 22, the flat springs being at the middle practically stationary with the outer frames 13 while the slotted ends of the flat springs are adapted to yield and move with the inner frames 20, thereby supporting the inner frames yieldingly within the outer frames.

A gridiron 22 is securely mounted within each of the inner frames 20.

The inner frames 20 are with this arrangement yieldingly interconnected with the outer frames 13, so that articles of various thicknesses can be placed between the gridirons 22 so that the gridirons will firmly hold various articles in an equaly firm manner.

A drip pan 23 is arranged under the burner in such a position that any fat or moisture from any material placed between gridirons in the enclosure may drip into this drip pan.

This whole arrangement including the enclosure, the double frame structure with gridirons, the drip pan, and the burner more properly may be called a unit and, of course, any number of units can be arranged on a common stand or stove-like structure.

It must be understood that the gridirons may serve to hold meat as well as bread and that the whole device may be used for broiling, or toasting, or any other similar purposes.

The double frame structure with the gridirons can be removed from the enclosure by the handles 12 so that any material can be conveniently placed between the hingedly connected frames and more particularly between the oppositely arranged gridirons in the double frames by unlatching the double frames and opening the double frames with the gridirons while removed from the enclosure. After having any material placed between the gridirons, the double frames are folded together again and latched and then simply lifted by the handles and inserted into suspended position within the enclosure 6.

In the slightly modified form illustrated in Fig. 4 the handle bar 12$_a$ rigidly mounted on the back 24 of this form. To the back 24 one of the outer frames 13$_a$ is firmly attached while the outer frame 13$_b$ is hingedly attached to the back as indicated at 25.

Inasmuch as the enclosure is mounted in a positive position in relation to the burner and inasmuch as the flames from the burner strike the enclosure in a certain manner, so as to heat the enclosure in a predetermined desired manner, and, furthermore, inasmuch as the double frame structure with the gridirons is suspended within certain notches in the enclosure in a certain relation to the heated large flat sides of the enclosure, a well predetermined equalized heat may be produced or assured on any material placed between the gridirons in the enclosure of this whole device and an even heat effect may be expected on the surface of an article so placed within the device.

Having thus described my invention, I claim:

In a device of the class described, an enclosure having an open top and bottom, burner-tubes arranged along the lower edges of the enclosure and having discharging orifices disposed to direct a flame over the upright outside of the enclosure, a sectioned frame structure hingedly connected at one edge and provided with a latch at the open edge, the hingedly connected edge embodying a hinge-pin in form of handles extending beyond the opposite ends of the frame by which the frame is suspendedly inserted through the open top with the handles resting over the top edge of the enclosure, smaller frames disposed within the sections of the first-named frame, resilient yielding interconnections between the first and second-named frames, and gridirons firmly mounted within the second-named frames and made yieldable in relation to the first-named frames by said yielding interconnections.

In testimony that I claim the foregoing as my invention I have signed my name.

ANTHONY DOVICA.